(12) United States Patent
Ikeda et al.

(10) Patent No.: US 12,256,137 B2
(45) Date of Patent: Mar. 18, 2025

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Hiroshi Ikeda, Tokyo (JP); Takashi Itou, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 258 days.

(21) Appl. No.: 17/914,136

(22) PCT Filed: Mar. 18, 2021

(86) PCT No.: PCT/JP2021/010976
§ 371 (c)(1),
(2) Date: Jan. 24, 2023

(87) PCT Pub. No.: WO2021/200184
PCT Pub. Date: Oct. 7, 2021

(65) Prior Publication Data
US 2023/0328355 A1    Oct. 12, 2023

(30) Foreign Application Priority Data
Mar. 31, 2020    (JP) .................. 2020-062196

(51) Int. Cl.
*H04N 23/61*    (2023.01)
*H04N 5/262*    (2006.01)
(Continued)

(52) U.S. Cl.
CPC ........... *H04N 23/61* (2023.01); *H04N 5/2628* (2013.01); *H04N 23/64* (2023.01); *H04N 23/69* (2023.01); *H04N 23/695* (2023.01); *H04N 5/268* (2013.01)

(58) Field of Classification Search
CPC ...... H04N 23/69; H04N 23/698; H04N 23/64; H04N 23/90; H04N 23/695; H04N 23/61;
(Continued)

(56) References Cited

U.S. PATENT DOCUMENTS 8,860,780 B1* 10/2014 Davey .................... H04N 23/69
348/39
9,591,364 B2* 3/2017 Kinoshita ............ H04N 23/611
(Continued)

FOREIGN PATENT DOCUMENTS

JP    2007-134845 A    5/2007
JP    2008-072261 A    3/2008
(Continued)

*Primary Examiner* — Pritham D Prabhakher
(74) *Attorney, Agent, or Firm* — Paratus Law Group, PLLC

(57) ABSTRACT

There is provided an information processing apparatus, an information processing method, and a program capable of easily obtaining a captured image with an appropriate angle of view with a small number of imaging apparatuses. The information processing apparatus includes: a view angle candidate setting unit configured to set a plurality of candidates for an angle of view from a captured image range that can be captured by a first imaging apparatus with respect to a predetermined imaging space; and an imaging view angle setting unit configured to set an imaging angle of view of the first imaging apparatus on a basis of the plurality of candidates for the angle of view. The present technology can be applied to, for example, a system that captures a television broadcast program, or the like.

17 Claims, 10 Drawing Sheets

(51) Int. Cl.
*H04N 5/268* (2006.01)
*H04N 23/60* (2023.01)
*H04N 23/69* (2023.01)
*H04N 23/695* (2023.01)

(58) Field of Classification Search
CPC .... H04N 17/002; H04N 5/268; H04N 5/2628; G03B 17/56; G03B 15/00; G02B 7/08
USPC .......................................................... 348/239
See application file for complete search history.

(56) References Cited

U.S. PATENT DOCUMENTS

| | | | | |
|---|---|---|---|---|
| 9,699,378 B2* | 7/2017 | Miyamoto | ........... | H04N 23/698 |
| 9,876,993 B2* | 1/2018 | Sablak | ................... | H04N 7/183 |
| 10,547,774 B2* | 1/2020 | Kinoshita | .............. | H04N 23/69 |
| 11,012,614 B2* | 5/2021 | Kinoshita | ........... | H04N 23/611 |
| 2009/0268079 A1* | 10/2009 | Motomura | ............. | H04N 5/772 |
| | | | | 375/E7.076 |
| 2010/0103192 A1* | 4/2010 | Fukumoto | .............. | H04N 23/73 |
| | | | | 382/209 |
| 2010/0141767 A1* | 6/2010 | Mohanty | ......... | G08B 13/19643 |
| | | | | 348/E5.024 |
| 2011/0285808 A1* | 11/2011 | Feng | ...................... | H04N 7/142 |
| | | | | 348/E7.083 |
| 2012/0044347 A1* | 2/2012 | Sugio | .................... | H04N 23/69 |
| | | | | 348/240.99 |
| 2012/0081510 A1* | 4/2012 | Miyamoto | ........... | G06T 3/4038 |
| | | | | 348/E7.001 |
| 2013/0342720 A1* | 12/2013 | Azami | .................. | H04N 7/183 |
| | | | | 348/222.1 |
| 2014/0081956 A1* | 3/2014 | Yuki | ................ | H04N 21/44012 |
| | | | | 707/722 |
| 2015/0350523 A1* | 12/2015 | Kinoshita | ................. | G06T 5/70 |
| | | | | 348/352 |
| 2015/0373414 A1* | 12/2015 | Kinoshita | ........... | G06V 40/172 |
| | | | | 386/282 |
| 2017/0220871 A1* | 8/2017 | Ikeda | .................... | H04N 23/69 |
| 2018/0278852 A1* | 9/2018 | Lin | ........................ | H04N 23/69 |
| 2020/0059595 A1* | 2/2020 | Ono | ....................... | H04N 23/695 |
| 2020/0120262 A1* | 4/2020 | Kinoshita | ........... | G06V 40/161 |

FOREIGN PATENT DOCUMENTS

| | | |
|---|---|---|
| JP | 2011-101165 A | 5/2011 |
| JP | 2012-060510 A | 3/2012 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/010976 (filed on Mar. 18, 2021) under 35 U.S.C. § 371, which claims priority to Japanese Patent Application No. 2020-062196 (filed on Mar. 31, 2020), which are all hereby incorporated by reference in their entirety.

TECHNICAL FIELD

The present technology relates to an information processing apparatus, an information processing method, and a program, and more particularly, to an information processing apparatus, an information processing method, and a program capable of easily obtaining an image with an appropriate angle of view with a small number of imaging apparatuses.

BACKGROUND ART

In related art, at a site of program production such as television broadcasting, images with various angles of view are captured using many imaging apparatuses so that an image with an appropriate angle of view can be provided to a viewer/listener (see, for example, Patent Document 1.).

CITATION LIST

Patent Document

Patent Document 1: Japanese Patent Application Laid-Open No. 2011-101165

SUMMARY OF THE INVENTION

Problems to be Solved by the Invention

On the other hand, in recent years, video distribution platforms have been diversified, and video production and video distribution are increasingly performed by a small number of persons or persons having no specialized knowledge. Along with this, there is an increasing demand for a technology capable of easily obtaining an image with an appropriate angle of view with a small number of imaging apparatuses.

The present technology has been made in view of such a situation, and an object of the present technology is to easily obtain an image with an appropriate angle of view with a small number of imaging apparatuses.

Solutions to Problems

An information processing apparatus according to an aspect of the present technology includes a view angle candidate setting unit configured to set a plurality of candidates for an angle of view from a captured image range that can be captured by a first imaging apparatus with respect to a predetermined imaging space, and an imaging view angle setting unit configured to set an imaging angle of view of the first imaging apparatus on the basis of the plurality of candidates for the angle of view.

An information processing method according to an aspect of the present technology includes: by an information processing apparatus, setting a plurality of candidates for an angle of view from a captured image range that can be captured by an imaging apparatus with respect to a predetermined imaging space; and setting an imaging angle of view of the imaging apparatus on the basis of the plurality of candidates for the angle of view.

A program according to an aspect of the present technology for causing a computer to execute processing of: setting a plurality of candidates for an angle of view from a captured image range that can be captured by an imaging apparatus with respect to a predetermined imaging space; and setting an imaging angle of view angle of the imaging apparatus on the basis of the plurality of candidates for the angle of view.

According to an aspect of the present technology, a plurality of candidates for an angle of view from a captured image range that can be captured by an imaging apparatus with respect to a predetermined imaging space is set, and an imaging angle of view of the imaging apparatus is set on the basis of the plurality of candidates for the angle of view.

MODE FOR CARRYING OUT THE INVENTION

Modes for carrying out the present technology (hereinafter, referred to as embodiments) will be described below. The description will be given in the following order.
1. Background
2. First embodiment
3. Second embodiment
4. Modifications
5. Others

1. Background

As described above, in related art, in a program production site such as television broadcasting, images of various angles of view are captured using many imaging apparatuses. Then, an image to be used for broadcasting, or the like, is appropriately switched among the images of various angles of view.

Figure 1:
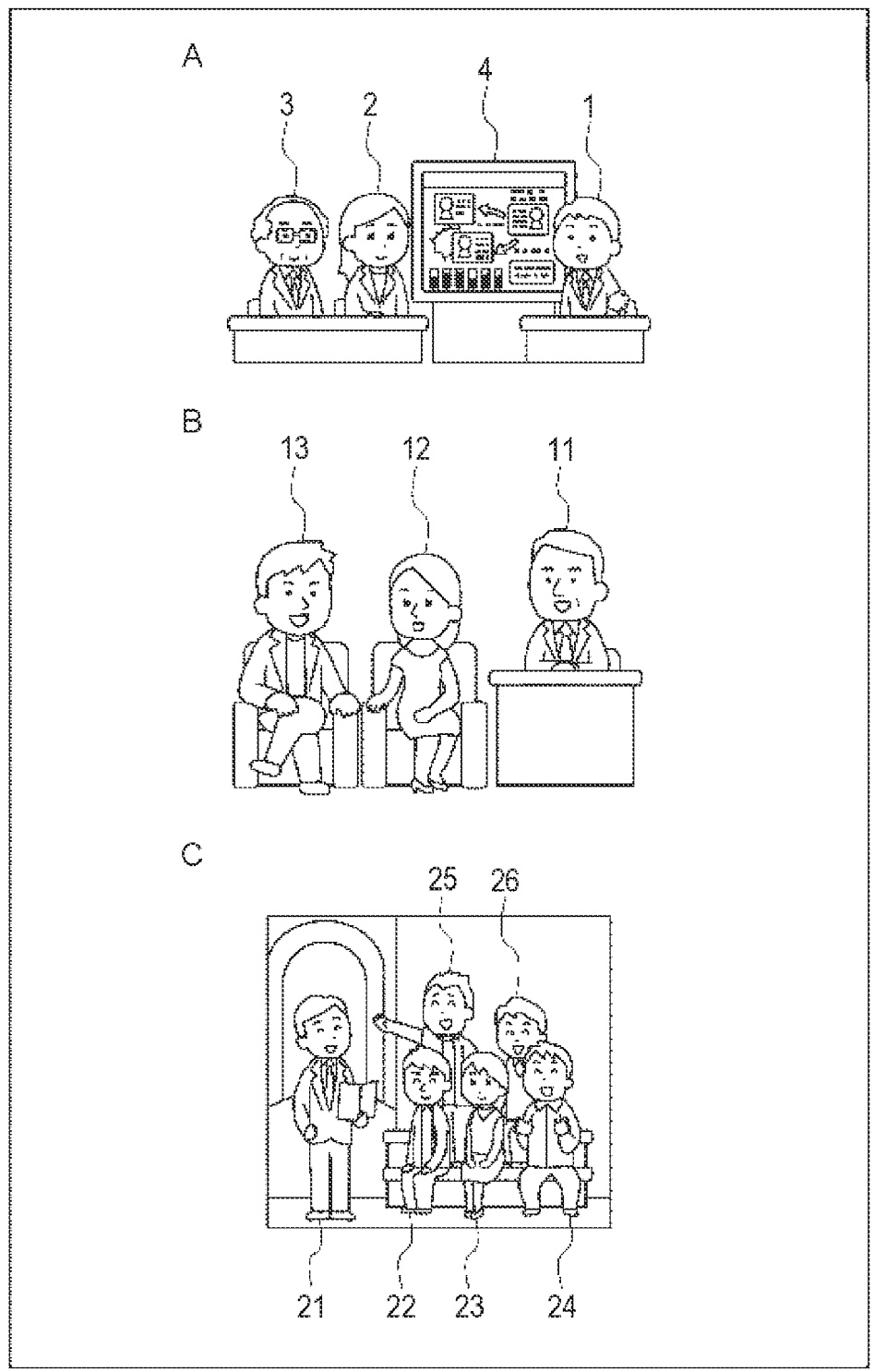
FIG. 1 is a view illustrating an example of an imaging scene.

For example, A of FIG. 1 illustrates an example of a scene of a news program. In this example, three persons, namely, a newscaster 1, a commentator 2, and a commentator 3 are seated side by side in this order from the right. In addition, a monitor 4 is disposed between the newscaster 1 and the commentator 2.

In this case, for example, it is assumed that at least captured images obtained by individually imaging the newscaster 1, the commentator 2, and the commentator 3 as bust shots, a captured image (group shot) obtained by collectively imaging the adjacent commentators 2 and 3, and a captured image obtained by imaging the entire scene are captured.

B of FIG. 1 illustrates an example of a scene of a talk program. In this example, three persons, namely, a host 11, a guest 12, and a guest 13 are seated side by side in this order from the right.

In this case, for example, it is assumed that at least captured images obtained by individually imaging the host 11, the guest 12, and the guest 13 as bust shots, a captured image (group shot) obtained by collectively imaging the adjacent guests 12 and 13, and a captured image obtained by imaging the entire scene are captured.

C of FIG. 1 illustrates an example of a scene of a variety program. In this example, a host 21 stands at the left end. Furthermore, on the right side of the host 21, guests 22 to 24 are seated in the first row on the platform, and guests 25 and 26 are seated in the second row on the platform.

In this case, for example, it is assumed that at least captured images obtained by individually imaging the host 21 and the guests 22 to 26 as bust shots, a captured image (group shot) obtained by collectively imaging the adjacent guests 22 to 26, and a captured image obtained by imaging the entire scene are captured.

Here, if the captured images of the respective angles of view are captured by different imaging apparatuses, necessary cost and the number of camera operators increase. In addition, control of the imaging apparatus, and the like, becomes complicated.

On the other hand, in related art, a method of obtaining images of a plurality of angles of view with one imaging apparatus is used. For example, a cutting out method and a PTZ control method are known as methods for obtaining images of a plurality of angles of view with one imaging apparatus.

The cutting out method is a method of imaging a wide range in a state where PTZ (panning, tilting, and zooming) of the imaging apparatus is fixed and cutting out an image with a necessary angle of view from the captured image. For example, in the example of A of FIG. 1, a captured image of the entire scene is captured, and images of bust shots of respective persons, and the like, are individually cut out from the obtained captured image.

In the cutting out method, images with various angles of view can be simultaneously obtained. In addition, there is no physical restriction, and thus, the angle of view can be immediately switched.

On the other hand, in the cutting out method, there is a possibility that image quality (resolution) may deteriorate in a case where a small subject is to be zoomed in. Furthermore, in a case where motion of a subject is fast, there is a possibility that motion blur may occur.

The PTZ control method is a method of driving the PTZ of the imaging apparatus and performing imaging while physically moving the angle of view of the imaging apparatus.

In the PTZ control method, the PTZ is driven, so that variation in the angle of view can be increased.

On the other hand, in the PTZ control method, it is necessary to physically move the imaging apparatus to change the angle of view (subject or composition), which takes time to obtain an image with a necessary angle of view. Thus, there is a case where an image with a desired angle of view cannot be obtained as a result of, for example, the subject moving before the angle of view is adjusted.

As described above, both methods have advantages and disadvantages, and advantages and disadvantages are in a trade-off relationship.

On the other hand, the present technology improves the disadvantages of both methods and enables an image with an appropriate angle of view to be easily obtained with a small number of imaging apparatuses.

2. First Embodiment

First, a first embodiment of the present technology will be described with reference to FIGS. 2 to 9.

<Configuration of Information Processing System 101>

Figure 2:
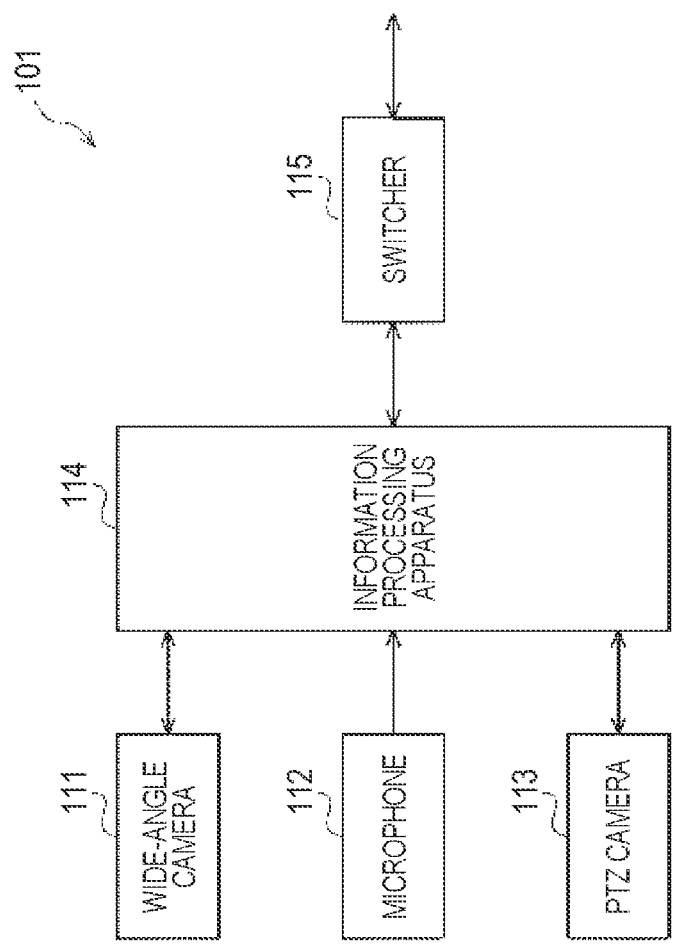
FIG. 2 is a block diagram illustrating a first embodiment of an information processing system to which the present technology is applied.

FIG. 2 illustrates a configuration example of an information processing system 101 according to the first embodiment of the present technology.

The information processing system 101 includes a wide-angle camera 111, a microphone 112, a PTZ camera 113, an information processing apparatus 114, and a switcher 115. The wide-angle camera 111, the microphone 112, the PTZ camera 113, the information processing apparatus 114, and the switcher 115 are connected to one another via a wired and/or wireless network and exchange various kinds of data.

The wide-angle camera 111 includes, for example, an imaging apparatus capable of wide-angle imaging. The wide-angle camera 111 is installed, for example, in a place where an imaging space can be widely viewed (overlooked) and performs wide-angle imaging so that the imaging space is widely included. The wide-angle camera 111 transmits image data (hereinafter, referred to as wide-angle image data) corresponding to a captured image (hereinafter, referred to as a wide-angle image) obtained by wide-angle imaging to the information processing apparatus 114.

Here, the imaging space is a three-dimensional space in which imaging by the information processing system 101 is performed and is, for example, a space in which an event to be imaged (for example, program production, sports games, and the like) is performed.

Note that the PTZ and a position of the wide-angle camera 111 are normally fixed.

The microphone 112 collects sound in the imaging space and transmits sound data corresponding to the collected sound to the information processing apparatus 114.

The PTZ camera 113 includes, for example, an imaging apparatus capable of remotely controlling the PTZ. The angle of view of the PTZ camera 113 is controlled by driving the PTZ under control of the information processing apparatus 114. The PTZ camera 113 images the imaging space and transmits image data corresponding to the obtained captured image to the information processing apparatus 114.

Note that a position of the PTZ camera 113 is normally fixed.

The information processing apparatus 114 includes, for example, a computer, or the like. The information processing apparatus 114 calibrates the wide-angle camera 111 and the PTZ camera 113. Furthermore, the information processing apparatus 114 recognizes a situation of the imaging space on the basis of the wide-angle image data and the sound data. For example, a state of the subject in the imaging space, content of a scene (hereinafter, referred to as an imaging scene) in the imaging space, content of sound and a position of a sound source in the imaging space, a state of an event being performed in the imaging space, and the like, are recognized as the situation of the imaging space.

The information processing apparatus 114 controls an angle of view of the PTZ camera 113 by driving the PTZ of the PTZ camera 113 in accordance with the situation of the imaging space. Furthermore, the information processing apparatus 114 cuts out an image with a necessary angle of view from the captured image captured by the PTZ camera 113 and transmits image data (hereinafter, referred to as cutout image data) corresponding to the cutout image (hereinafter, referred to as a cutout image) to the switcher 115. Further, the information processing apparatus 114 transmits the wide-angle image data to the switcher 115.

The switcher 115 selects a necessary image from the wide-angle image and the cutout image and transmits image data corresponding to the selected image to the subsequent stage. Further, the switcher 115 cuts out an image with a necessary angle of view from the wide-angle image as necessary and transmits image data corresponding to the cutout image to the subsequent stage.

<Configuration Example of Information Processing Apparatus 114>

Figure 3:
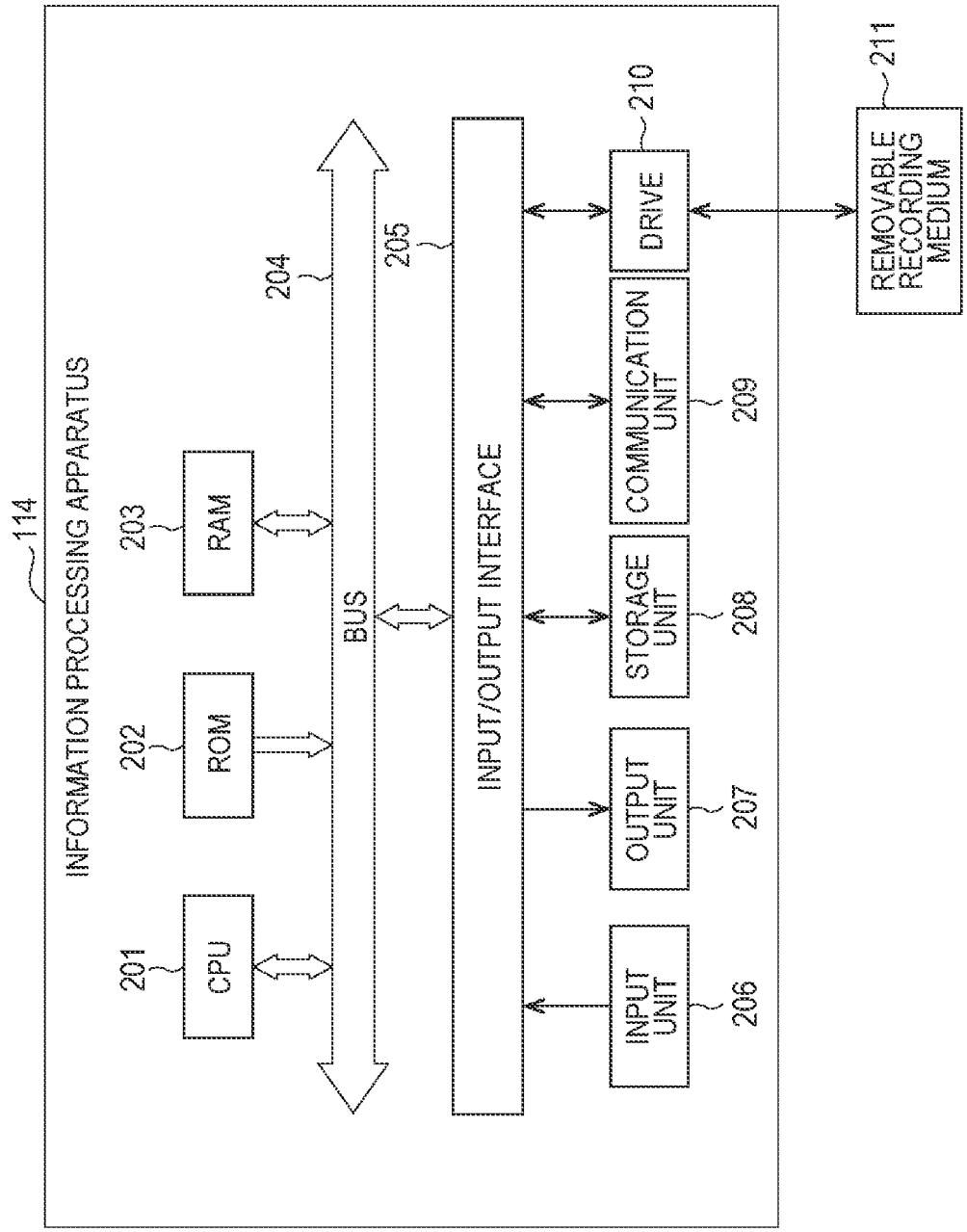
FIG. 3 is a block diagram illustrating a configuration example of an imaging apparatus.

FIG. 3 illustrates a configuration example of hardware of the information processing apparatus 114.

In the information processing apparatus 114, a CPU 201, a read only memory (ROM) 202, and a random access memory (RAM) 203 are connected to one another via a bus 204. An input/output interface 205 is further connected to the bus 204. An input unit 206, an output unit 207, a storage unit 208, a communication unit 209, and a drive 210 are connected to the input/output interface 205.

The input unit 206 includes, for example, a keyboard, a mouse, a microphone, and the like.

The output unit 207 includes, for example, a display, a speaker, and the like.

The storage unit 208 includes, for example, a non-volatile memory such as a hard disk.

The communication unit 209 communicates with the wide-angle camera 111, the microphone 112, the PTZ camera 113, and the switcher 115 using a predetermined communication scheme.

The drive 210 drives a removable recording medium 211 such as, for example, a magnetic disk, an optical disk, a magneto-optical disk and a semiconductor memory.

Note that the program to be executed by the information processing apparatus 114 (CPU 201) can be provided by being recorded in the removable recording medium 211 as a package medium, or the like, for example. The program recorded in the removable recording medium 211 is installed in the storage unit 208 via the input/output interface 205, for example, by the removable recording medium 211 being attached to the drive 210.

Furthermore, the program is, for example, received by the communication unit 209 via a wired or wireless transmission medium such as a local area network, the Internet, and digital satellite broadcasting and is installed in the storage unit 208.

Furthermore, the program can be installed in advance in the ROM 202 or the storage unit 208, for example.

Then, in the information processing apparatus 114, for example, the CPU 201 loads a program stored in the ROM 202 or the storage unit 208 into the RAM 203 via the input/output interface 205 and the bus 204 and executes the program, thereby performing a series of processing.

Note that, hereinafter, description of the bus 204 and the input/output interface 205 in a case where each unit exchanges data, and the like, via the bus 204 and the input/output interface 205 in the information processing apparatus 114 will be omitted. For example, in a case where the CPU 201 and the communication unit 209 perform communication via the bus 204 and the input/output interface 205, description of the bus 204 and the input/output interface 205 will be omitted, and the case will be simply described as the CPU 201 and the communication unit 209 performing communication.

<Configuration Example of Information Processing Unit 251>

Figure 4:
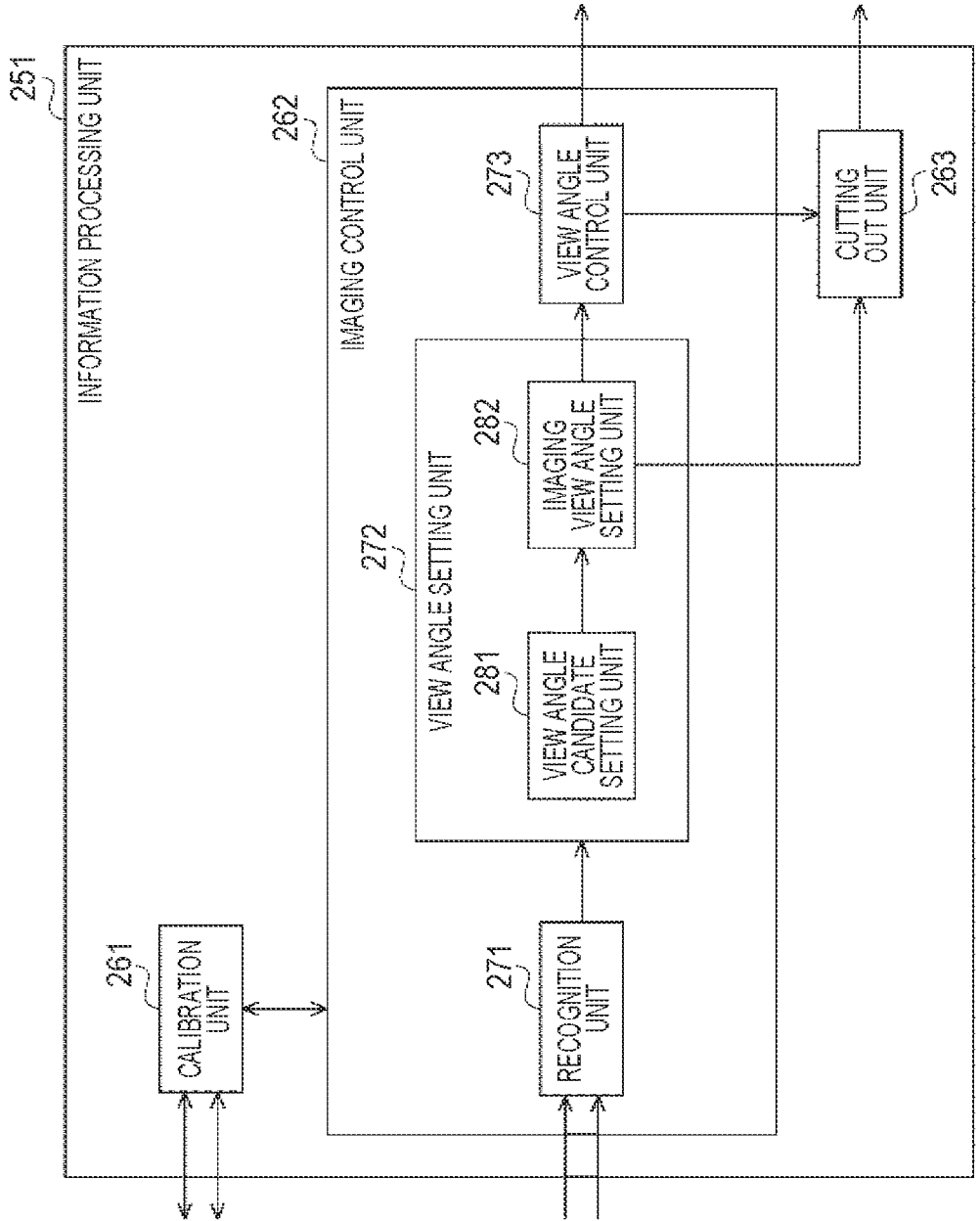
FIG. 4 is a block diagram illustrating a first embodiment of an information processing unit of an information processing apparatus.

FIG. 4 illustrates a configuration example of the information processing unit 251 which is a first embodiment of functions to be implemented by the CPU 201 of the information processing apparatus 114 executing a program.

The information processing unit 251 includes a calibration unit 261, an imaging control unit 262, and a cutting out unit 263.

The calibration unit 261 calibrates the wide-angle camera 111 and the PTZ camera 113. For example, the calibration unit 261 obtains positions and orientations of the wide-angle camera 111 and the PTZ camera 113 in a world coordinate system common to the wide-angle camera 111 and the PTZ camera 113. Specifically, the calibration unit 261 obtains a transformation matrix that transforms the world coordinate system into a camera coordinate system unique to each of the wide-angle camera 111 and the PTZ camera 113. The camera coordinate system is a coordinate system based on optical axes of the wide-angle camera 111 and the PTZ camera 113. The calibration unit 261 supplies information regarding the transformation matrices of the wide-angle camera 111 and the PTZ camera 113 to the imaging control unit 262.

The imaging control unit 262 controls the PTZ of the PTZ camera 113 to control the angle of view of the PTZ camera 113. The imaging control unit 262 includes a recognition unit 271, a view angle setting unit 272 and a view angle control unit 273.

The recognition unit 271 recognizes a situation of the imaging space on the basis of the wide-angle image data from the wide-angle camera 111 and the sound data from the microphone 112. The recognition unit 271 supplies information regarding the recognized situation of the imaging space to the view angle setting unit 272.

The view angle setting unit 272 sets an angle of view (hereinafter, referred to as an imaging angle of view) at which the PTZ camera 113 images the imaging space on the basis of the situation of the imaging space. The view angle setting unit 272 includes a view angle candidate setting unit 281 and an imaging view angle setting unit 282.

The view angle candidate setting unit 281 sets a plurality of candidates for the angle of view from a captured image range that can be captured by the PTZ camera 113 on the basis of the situation of the imaging space. The candidates for the angle of view are, for example, angles of view predicted to be used in broadcasting, or the like. The view angle candidate setting unit 281 supplies information regarding the set candidates for the angle of view to the imaging view angle setting unit 282.

The imaging view angle setting unit 282 sets the imaging angle of view on the basis of the candidates for the angle of view. The imaging view angle setting unit 282 supplies information regarding the imaging angle of view to the view angle control unit 273. Furthermore, the imaging view angle setting unit 282 supplies the imaging angle of view and information regarding the candidates for the angle of view included in the imaging angle of view to the cutting out unit 263.

The view angle control unit 273 controls the angle of view of the PTZ camera 113 by driving the PTZ of the PTZ camera 113. Further, the view angle control unit 273 supplies information indicating a state of the angle of view of the PTZ camera 113 to the cutting out unit 263.

The cutting out unit 263 cuts out an image with a necessary angle of view from the captured image captured by the PTZ camera 113 and transmits cutout image data corresponding to the cutout image (cutout image) to the switcher 115 via the communication unit 209.

<First Embodiment of View Angle Control Processing>

Next, a first embodiment of view angle control processing to be executed by the information processing apparatus 114 will be described with reference to a flowchart of FIG. 5.

This processing is started, for example, when imaging of the imaging space is started and ends when imaging of the imaging space ends.

Furthermore, it is assumed that the calibration unit 261 calibrates the wide-angle camera 111 and the PTZ camera 113 before this processing, and the transformation matrices of the wide-angle camera 111 and the PTZ camera 113 are known. In other words, it is assumed that positions and orientations of the wide-angle camera 111 and the PTZ camera 113 in the world coordinate system are known.

In step S1, the recognition unit 271 recognizes a situation of the imaging space.

Specifically, the recognition unit 271 acquires the wide-angle image data from the wide-angle camera 111 via the communication unit 209 and acquires the sound data from the microphone 112. The recognition unit 271 recognizes the situation of the imaging space by performing image recognition on the wide-angle image data and performing sound recognition on the sound data.

For example, the recognition unit 271 recognizes a state of the subject in the wide-angle image. More specifically, the recognition unit 271 recognizes the subject present in the wide-angle image and recognizes a type, a position, a posture, motion, feature points, and the like, of each subject using a method such as face detection, face recognition, posture recognition, motion recognition, and object detection, for example.

Figure 6:
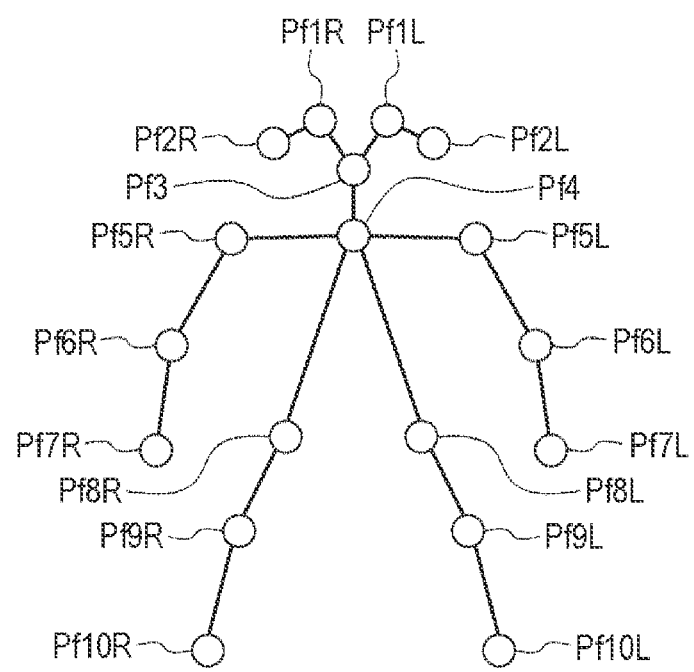
FIG. 6 is a view illustrating an example of feature points of a person.

FIG. 6 illustrates an example of feature points to be detected in a case where the subject is a person.

A feature point Pf1L corresponds to the left eye, and a feature point Pf1R corresponds to the right eye. A feature point Pf2L corresponds to the left ear, and a feature point Pf2R corresponds to the right ear. A feature point Pf3 corresponds to the nose. A feature point Pf4 corresponds to the joint of the neck. A feature point Pf5L corresponds to the joint of the left shoulder, and a feature point Pf5R corresponds to the joint of the right shoulder. A feature point Pf6L corresponds to the joint of the left elbow, and a feature point Pf6R corresponds to the joint of the right elbow. A feature point Pf7L corresponds to the joint of the left wrist, and a feature point Pf7R corresponds to the joint of the right wrist. A feature point Pf8L corresponds to the joint of the left buttock, and a feature point Pf8R corresponds to the joint of the right buttock. A feature point Pf9L corresponds to the joint of the left knee, and a feature point Pf9R corresponds to the joint of the right knee. A feature point Pf10L corresponds to the joint of the left ankle, and a feature point Pf10R corresponds to the joint of the right ankle.

For example, the skeleton, a posture, motion, and the like, of the person are recognized by detecting and tracking the feature points including the joints of the person in this manner.

Furthermore, the recognition unit 271 recognizes content of the imaging scene using a method such as scene recognition. Furthermore, the recognition unit 271 recognizes a main subject (hereinafter, referred to as a main subject) and a subject related to the main subject (hereinafter, referred to as a related subject) on the basis of the state of the subject and the content of the imaging scene.

For example, in a case where the content of the imaging scene is a talk program, a main person of the talk (for example, a speaker, a guest, a main person of a topic, and the like), a monitor, a flip, or the like, may be recognized as the main subject. Furthermore, for example, a person listening to a speech of the main person, a partner of the main person, a flip, or the like, may be recognized as the related subject.

For example, in a case where the content of the imaging scene is live music, a main person (for example, a vocalist, a guitar performer playing a guitar solo, or the like) of the live may be recognized as the main subject. In addition, for example, a member other than the main person, a co-performer, a musical instrument, or the like, may be recognized as the related subject.

For example, in a case where the content of the imaging scene is sports relay, the main person (for example, a player holding a ball, a player in the top spot, or the like) of the sport may be recognized as the main subject. Furthermore, for example, a player other than the main person, a ball, or the like, may be recognized as the related subject.

Moreover, the recognition unit 271 recognizes, for example, the content of the sound in the imaging space, the position of the sound source, and the like.

Furthermore, the recognition unit 271 recognizes a state of the event being performed in the imaging space on the basis of, for example, the state of the subject, the content of the imaging scene, the content of the sound in the imaging space, the position of the sound source, and the like.

The recognition unit 271 supplies information regarding the recognized situation of the imaging space to the view angle setting unit 272.

In step S2, the view angle candidate setting unit 281 sets candidates for the angle of view on the basis of the situation of the imaging space. For example, the view angle candidate setting unit 281 sets the candidates for the angle of view on the basis of the main subject, the related subject, and the content of the imaging scene.

For example, in a case where the content of the imaging scene is a talk program, an angle of view (bust shot) including a portion above a chest of the main person who is the main subject, an angle of view including a combination of the main subject and each related subject, and the like, are set as the candidates for the angle of view.

For example, in a case where the content of the imaging scene is live music, an angle of view (waist shot) including a portion above the waist of the main person who is the main subject, an angle of view (full figure) including the entire body, an angle of view including a combination of the main subject and each related subject, and the like, are set as the candidates for the angle of view.

For example, in a case where the content of the imaging scene is a sports game, an angle of view (full figure)

including the entire body of the main person who is the main subject, an angle of view including a combination of the main subject and each related subject, and the like, are set as the candidates for the angle of view.

Figure 7:
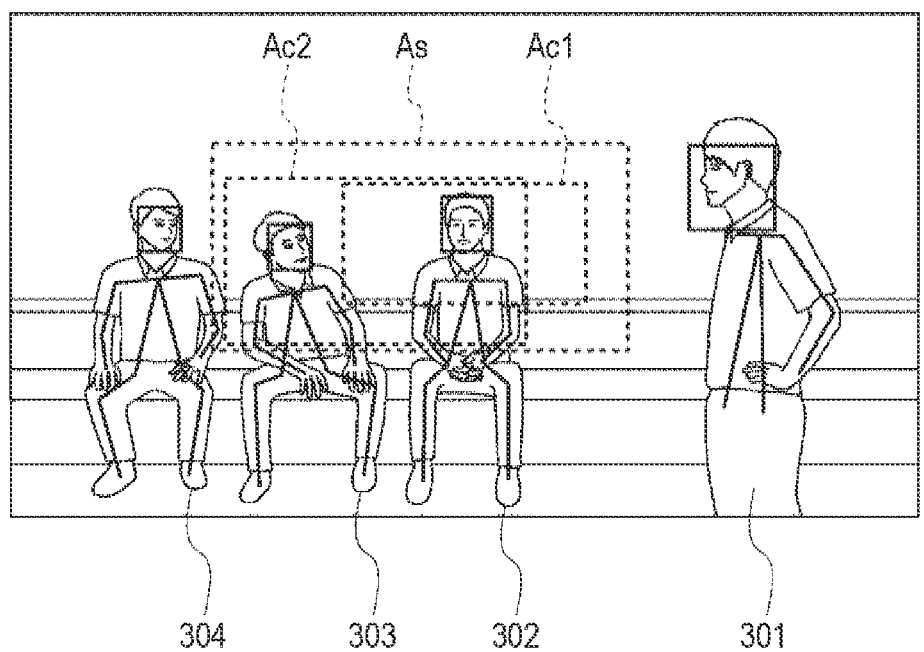
FIG. 7 is a view for explaining a method for setting candidates for an angle of view and an imaging angle of view.

FIG. 7 illustrates an example of setting of the candidates for the angle of view. In this example, an example of a wide-angle image of a talk program is schematically illustrated. This wide-angle image includes persons 301 to 304. Note that auxiliary lines superimposed on the persons 301 to 304 in this drawing indicate results of face recognition and skeleton recognition.

The person 301 stands near the right edge in the wide-angle image, and the person 302 to the person 304 are seated side by side in a range from the vicinity of the center to the left edge of the wide-angle image.

Here, for example, it is assumed that the person 302 is speaking and the person 303 is listening to a speech of the person 302. In this case, for example, the person 302 is recognized as the main subject, and the person 303 is recognized as the related subject. Then, for example, a candidate for the angle of view Ac1 including a portion above the chest of the person 302 and a candidate for the angle of view Ac2 including portions above the waist of the person 302 and the waist of the person 303 are set.

The view angle candidate setting unit 281 supplies information regarding the set candidates for the angle of view to the imaging view angle setting unit 282.

In step S3, the imaging view angle setting unit 282 calculates an image frame including all the candidates for the angle of view. For example, the imaging view angle setting unit 282 calculates a minimum rectangular frame including all the candidates for the angle of view as the image frame.

In step S4, the imaging view angle setting unit 282 adds a margin to the calculated image frame. For example, the imaging view angle setting unit 282 expands the image frame by adding a margin in at least one direction of the periphery of the calculated image frame on the basis of motion of each of the main subject and the related subject. In this event, the margin in the direction in which motion of the main subject and the related subject is large becomes large, and the margin in the direction in which motion of the main subject and the related subject is small becomes small.

In step S5, the imaging view angle setting unit 282 determines whether or not a cutout size of the main candidate for the angle of view is equal to or larger than a threshold value.

Specifically, the imaging view angle setting unit 282 selects a candidate for the angle of view (hereinafter, referred to as a main candidate for the angle of view) estimated to be the most important from the candidates for the angle of view on the basis of sizes, positions, postures, motion, and the like, of the main subject and the related subject, the content of the imaging scene, a usage of the image, and the like. Here, as the usage of the image, for example, television broadcasting, web distribution, production of video software, and the like, are assumed.

Next, the imaging view angle setting unit 282 calculates resolution (the number of pixels) of the main candidate for the angle of view in a case where the image of the imaging angle of view corresponding to the calculated image frame is captured by the PTZ camera 113.

Next, the imaging view angle setting unit 282 compares the calculated resolution with a predetermined threshold value. This threshold value varies depending on the usage of the image, for example. For example, the threshold value is set to 1920 pixels×1080 pixels (FHD) in a case where the usage of the image is television broadcasting and is set to 1280 pixels×720 pixels (HD) in a case of web distribution.

Then, in a case where the resolution of the main candidate for the angle of view is less than the threshold value, the imaging view angle setting unit 282 determines that the cutout size of the main candidate for the angle of view is less than the threshold value, and the processing proceeds to step S6.

In step S6, the imaging view angle setting unit 282 excludes a candidate for the angle of view closest to an edge of the image frame among the candidates for the angle of view other than the main candidate for the angle of view.

Thereafter, the processing returns to step S3, and the processing of steps S3 to S6 is repeatedly executed until it is determined in step S5 that the cutout size of the main candidate for the angle of view is equal to or larger than the threshold value.

Accordingly, until the cutout size (resolution) of the main candidate for the angle of view becomes equal to or larger than the threshold value, the candidates for the angle of view other than the main candidate for the angle of view are sequentially deleted from the edge of the image frame, and the image frame becomes smaller. As a result, the candidates for the angle of view to be included in the imaging angle of view are selected.

On the other hand, in step S5, in a case where the resolution of the main candidate for the angle of view is equal to or greater than the threshold value, the imaging view angle setting unit 282 determines that the cutout size of the main candidate for the angle of view is equal to or greater than the threshold value, and the processing proceeds to step S7.

In step S7, the imaging view angle setting unit 282 sets the calculated image frame as the imaging angle of view. As a result, a region provided with a margin around the rectangular region including the selected candidate for the angle of view is set as the imaging angle of view. The imaging view angle setting unit 282 supplies information regarding the set imaging angle of view to the view angle control unit 273. In addition, the imaging view angle setting unit 282 supplies the set imaging angle of view and information regarding the candidates for the angle of view included in the imaging angle of view to the view angle control unit 273.

For example, in the example of FIG. 7, an imaging angle of view As including a candidate for the angle of view Ac1 and a candidate for the angle of view Ac2 and provided with a margin in the periphery is set.

In step S8, the view angle control unit 273 determines whether or not the captured image of the PTZ camera 113 is used. For example, in a case where a predetermined role is assigned to the captured image captured by the PTZ camera 113, for example, in a case where an image cut out from the captured image is output from the switcher 115 as an image for broadcasting, preview, or the like, the view angle control unit 273 determines that the captured image of the PTZ camera 113 is used, and the processing proceeds to step S9.

In step S9, the view angle control unit 273 performs low-speed control of the PTZ camera 113 so as to achieve the set imaging angle of view. Specifically, the view angle control unit 273 drives the PTZ of the PTZ camera 113 at gentle speed and adjusts the angle of view of the PTZ camera 113 to the set imaging angle of view.

Note that a driving speed of the PTZ of the PTZ camera 113 in this processing is set on the basis of, for example, a shutter speed of the PTZ camera 113, an allowable amount of motion blur, and the like. Furthermore, the allowable amount of the motion blur is set on the basis of, for example, the content of the imaging scene (for example, a sports relay, imaging at a studio, and the like), the usage of the image, and the like, (for example, television broadcasting, web distribution, production of video software, and the like). For example, in a case where the content of the imaging scene is a scene where motion of the subject is large like sports, the allowable amount of the motion blur is set to a large value. On the other hand, for example, in a case of a scene where the motion of the subject is small like imaging at a studio, the allowable amount of the motion blur is set to a small value.

As a result, the angle of view of the PTZ camera 113 is set to the angle of view (hereinafter, referred to as a full angle of view) including all the selected candidates for the angle of view.

Figure 8:
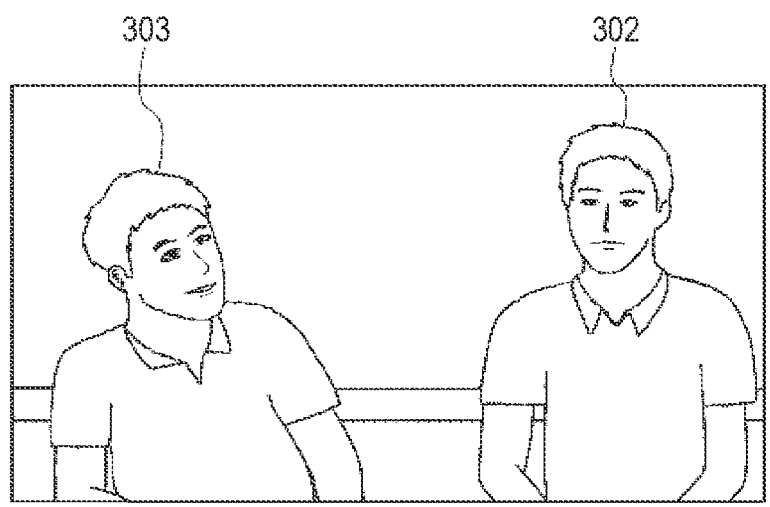
FIG. 8 is a view illustrating an example of a full angle-of-view image.

For example, as described above, in the example of FIG. 7, by setting the imaging angle of view As, as illustrated in FIG. 8, a full angle-of-view image including the person 302 and the person 303 is captured.

In addition, even if the angle of view of the PTZ camera 113 is changed, motion blur occurring in the captured image that is being used is reduced.

Thereafter, the processing proceeds to step S11.

On the other hand, in step S8, in a case where the predetermined role is not assigned to the image cut out from the captured image captured by the PTZ camera 113, for example, in a case where the image cut out from the captured image is not output from the switcher 115 as an image for broadcasting, preview, or the like, the view angle control unit 273 determines that the captured image of the PTZ camera 113 is not used, and the processing proceeds to step S10.

In step S10, the view angle control unit 273 performs high-speed control of the PTZ camera 113 so as to achieve the set imaging angle of view. Specifically, the view angle control unit 273 drives the PTZ of the PTZ camera 113 at high speed so that the angle of view of the PTZ camera 113 becomes the set imaging angle of view at earliest. For example, the PTZ is driven at maximum speed permitted by mechanical restriction of the PTZ camera 113.

As a result, the angle of view of the PTZ camera 113 is quickly set to the full angle of view.

Thereafter, the processing proceeds to step S11.

In step S11, the cutting out unit 263 cuts out the captured image. Specifically, the cutting out unit 263 acquires, from the PTZ camera 113, captured image data (hereinafter, referred to as full angle-of-view image data) captured at the full angle of view. Then, the cutting out unit 263 cuts out an image with an angle of view corresponding to each candidate for the angle of view from the full angle-of-view image corresponding to the full angle-of-view image data.

Figure 9:
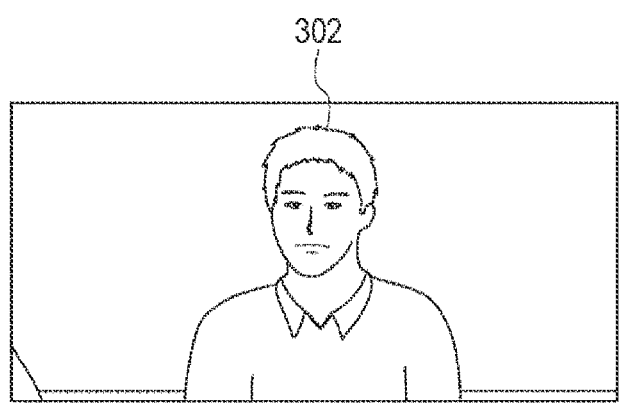
FIG. 9 is a view illustrating an example of a cutout image.

For example, as illustrated in FIG. 9, an image of an angle of view corresponding to the candidate for the angle of view Ac1 of FIG. 7 and including a bust shot of the person 302 is cut out from the full angle-of-view image of FIG. 8.

In this event, in a case where a plurality of candidates for the angle of view is set, the cutting out unit 263 cuts out images of angles of view corresponding to all the candidates for the angle of view.

In addition, the angle of view of the cutout image does not necessarily have to completely match the corresponding candidate for the angle of view. For example, the angle of view of the cutout image may be adjusted so that the subject is appropriately included.

The cutting out unit 263 transmits the cutout image data corresponding to the cutout image to the switcher 115 via the communication unit 209.

Thereafter, the processing returns to step S1, and the processing in step S1 and the subsequent step is executed.

As described above, by effectively combining the PTZ method and the cutting out method, an image with an appropriate angle of view and image quality can be obtained with a small number of imaging apparatuses. In other words, candidates for the angle of view that may be used are predicted in advance, and imaging is performed at an imaging angle of view including all the predicted candidates for the angle of view, so that an image with a required angle of view can be acquired at an appropriate timing. In addition, resolution of the main candidate for the angle of view is set to be equal to or greater than the predetermined threshold value, so that an image with favorable image quality can be obtained.

3. Second Embodiment

Next, a second embodiment of the present technology will be described with reference to FIGS. 10 to 12.

<Configuration of Information Processing System 401>

Figure 10:
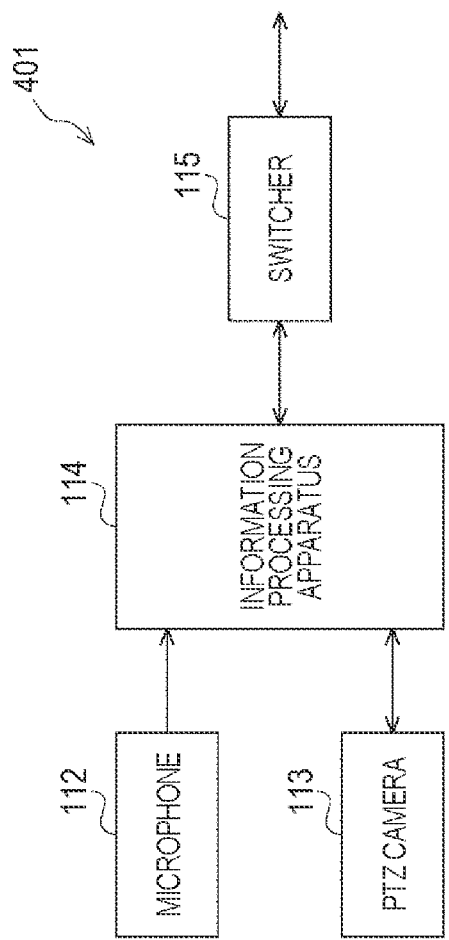
FIG. 10 is a block diagram illustrating a second embodiment of an information processing system to which the present technology is applied.

FIG. 10 illustrates a configuration example of an information processing system 401 according to the second embodiment of the present technology. Note that, in the drawing, portions corresponding to those of the information processing system 101 in FIG. 2 will be denoted by the same reference numerals, and description thereof will be omitted as appropriate.

The information processing system 401 in FIG. 10 is different from the information processing system 101 in FIG. 2 in that the wide-angle camera 111 is removed.

In the information processing system 401, the PTZ camera 113 captures both the wide-angle image and the full angle-of-view image. Then, the information processing apparatus 114 recognizes a situation of the imaging space on the basis of the wide-angle image or the full angle-of-view image captured by the PTZ camera 113 and the sound data and controls the imaging angle of view of the PTZ camera 113.

Here, the wide-angle image is an image captured while the PTZ camera 113 is set to a wide angle of view. The wide angle of view is an angle of view at which the imaging space can be viewed widely and is, for example, an angle of view at which a field of view of the PTZ camera 113 is maximized. For example, the wide angle of view is an angle of view that allows a wide view of an event occurring in the imaging space and is an angle of view that includes many subjects (people and objects) related to the event within a possible range.

Note that the angle of view at which the field of view is maximized is an angle of view at which the field of view is maximized within a predetermined setting range of the PTZ camera 113 and is not necessarily an angle of view at which the field of view of the PTZ camera 113 is mechanically maximized. For example, in a case where a setting range of the field of view of the PTZ camera 113 is set to a range smaller than a maximum value of the mechanical field of view of the PTZ camera 113, the angle of view at which the field of view is maximized in the setting range is set to the wide angle of view.

<Configuration Example of Information Processing Unit 451>

Figure 11:
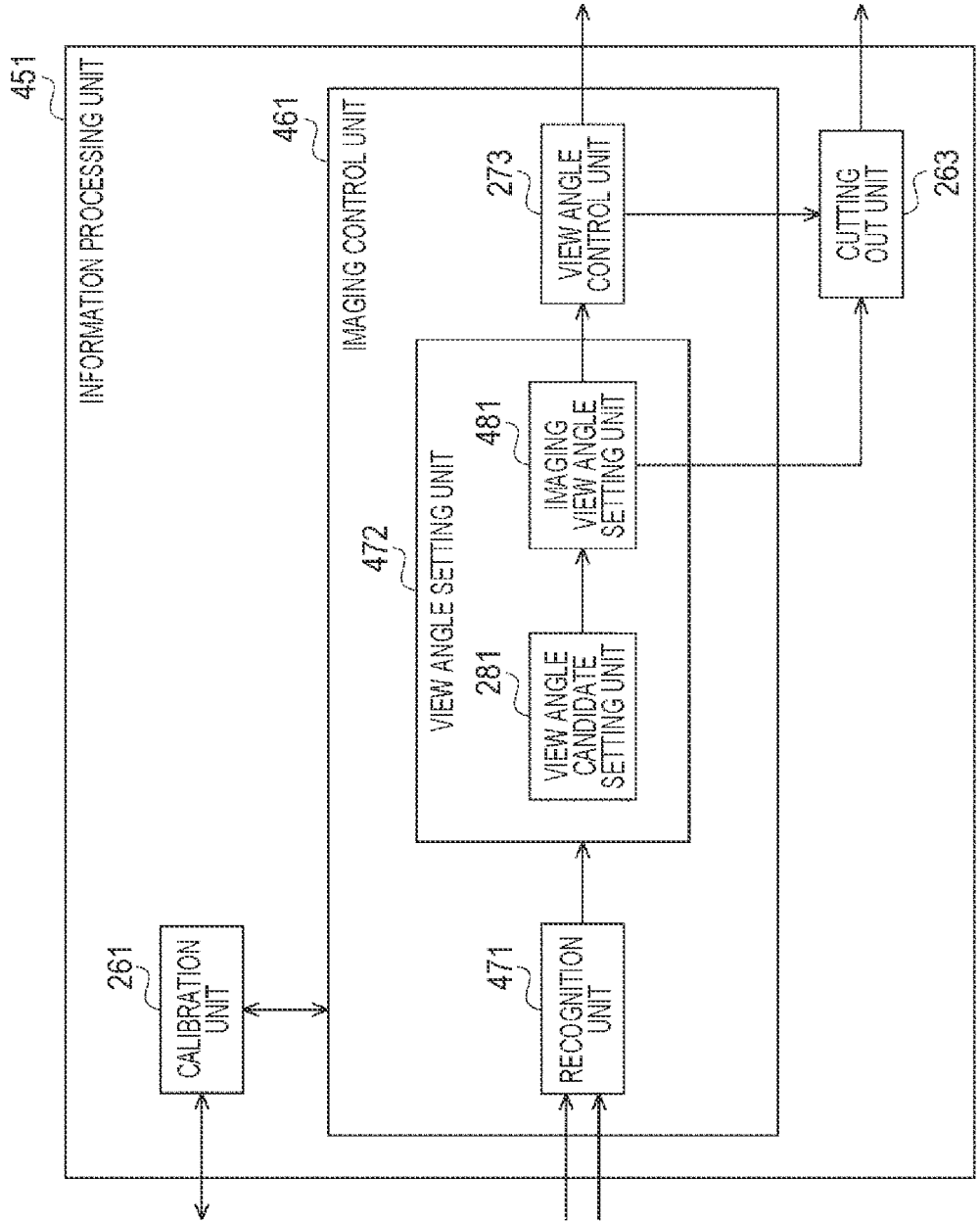
FIG. 11 is a block diagram illustrating a second embodiment of an information processing unit of an information processing apparatus.

FIG. 11 illustrates a configuration example of an information processing unit 451 which is a second embodiment of functions to be implemented by the CPU 201 of the information processing apparatus 114 executing a program. Note that, in the drawing, portions corresponding to those of the information processing unit 251 in FIG. 3 will be denoted by the same reference numerals, and description thereof will be omitted as appropriate.

The information processing unit 451 is similar to the information processing unit 251 in that the calibration unit 261 and the cutting out unit 263 are provided and is different in that an imaging control unit 461 is provided instead of the imaging control unit 262. The imaging control unit 461 is similar to the imaging control unit 262 in that it includes the view angle control unit 273 and is different from the imaging control unit 262 in that it includes a recognition unit 471 and a view angle setting unit 472 instead of the recognition unit 271 and the view angle setting unit 272. The view angle setting unit 472 is similar to the view angle setting unit 272 in that it includes the view angle candidate setting unit 281 and is different from the view angle setting unit 272 in that it includes an imaging view angle setting unit 481 instead of the imaging view angle setting unit 282.

The wide-angle camera 111 is not provided in the information processing system 401, and thus, the calibration unit 261 only calibrates the PTZ camera 113.

The recognition unit 471 recognizes the situation of the imaging space on the basis of the wide-angle image or the full angle-of-view image captured by the PTZ camera 113 and sound collected by the microphone 112. The recognition unit 471 supplies information regarding the recognized situation of the imaging space to the view angle setting unit 472.

The imaging view angle setting unit 481 sets the imaging angle of view on the basis of candidates for the angle of view. In addition, the imaging view angle setting unit 481 sets the imaging angle of view to the wide angle of view at a predetermined timing. The imaging view angle setting unit 481 supplies information regarding the imaging angle of view to the view angle control unit 273. Furthermore, the imaging view angle setting unit 481 supplies the imaging angle of view and information regarding the candidates for the angle of view included in the imaging angle of view to the cutting out unit 263.

<Second Embodiment of View Angle Control Processing>

Next, view angle control processing to be executed by the information processing apparatus 114 according to the second embodiment will be described with reference to a flowchart in FIG. 12.

This processing is started, for example, when imaging of the imaging space is started and ends when imaging of the imaging space ends.

In step S101, the information processing unit 451 performs high-speed control of the PTZ camera 113 so as to achieve a wide angle of view. Specifically, the imaging view angle setting unit 481 sets the imaging angle of view to the wide angle of view and supplies information regarding the set imaging angle of view to the view angle control unit 273. The view angle control unit 273 drives the PTZ of the PTZ camera 113 at high speed so that the angle of view of the PTZ camera 113 becomes a wide angle of view angle at earliest.

As a result, the angle of view of the PTZ camera 113 is set to the wide angle of view, and the PTZ camera 113 performs wide-angle imaging of the imaging space.

In step S102, the recognition unit 471 recognizes the situation of the imaging space. Specifically, the recognition unit 471 acquires wide-angle image data or full angle-of-view image data from the PTZ camera 113 via the communication unit 209 and acquires sound data from the microphone 112. Then, the recognition unit 471 recognizes the situation of the imaging space on the basis of the wide-angle image data or the full angle-of-view image data and the sound data through processing similar to step S1 in FIG. 5. The recognition unit 471 supplies information regarding the recognized situation of the imaging space to the view angle setting unit 472.

In step S103, the imaging view angle setting unit 481 determines whether or not the image includes the main subject. In a case where the imaging view angle setting unit 481 determines that the full angle-of-view image captured by the PTZ camera 113 includes the main subject on the basis of the recognition result of the situation of the imaging space, that is, in a case where it is determined that the main subject is present in the full angle-of-view image, the processing proceeds to step S104.

Figure 5:
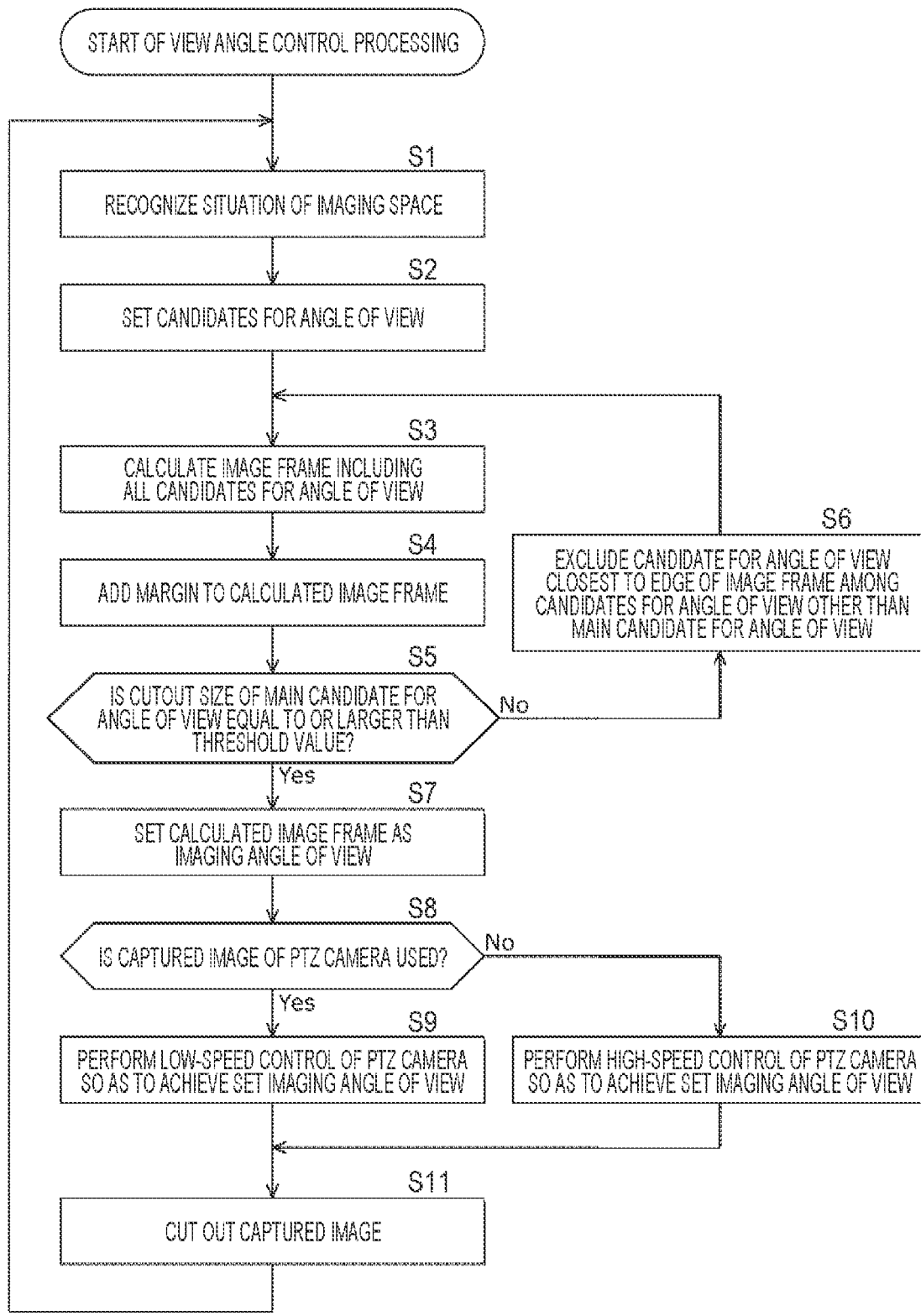
FIG. 5 is a flowchart for explaining a first embodiment of view angle control processing.

Thereafter, in steps S104 to S109, processing similar to that in steps S2 to S7 in FIG. 5 is executed. As a result, the imaging angle of view (full angle of view) is set.

In step S110, similarly to the processing in step S8 in FIG. 5, low-speed control of the PTZ camera 113 is performed so as to achieve the set imaging angle of view. In other words, only the PTZ camera 113 is provided as the imaging apparatus in the information processing system 401, and the captured image of the PTZ camera 113 is always used, so that the angle of view of the PTZ camera 113 is changed at low speed.

In step S111, the captured image is cut out similarly to the processing in step S11 in FIG. 5.

In step S112, the imaging view angle setting unit 481 determines whether or not a certain period of time has elapsed since the previous wide-angle imaging. In a case where it is determined that the certain period of time has not elapsed yet since the previous wide-angle imaging, the processing returns to step S102. Thereafter, the processing in step S102 and subsequent step is executed.

On the other hand, in a case where it is determined in step S112 that the certain period of time has elapsed since the previous wide-field imaging, the processing proceeds to step S113.

Furthermore, in a case where it is determined in step S103 that the full angle-of-view image captured by the PTZ camera 113 does not include the main subject, that is, in a case where it is determined that the main subject is not present in the full angle-of-view image, the processing of steps S104 to S112 is skipped, and the processing proceeds to step S113.

In step S113, the information processing unit 451 performs low-speed control of the PTZ camera 113 so as to achieve a wide angle of view. Specifically, the imaging view angle setting unit 481 sets the imaging angle of view to the wide angle of view and supplies information regarding the set imaging angle of view to the view angle control unit 273. Similarly to the processing in step S9 in FIG. 5, the view angle control unit 273 drives the PTZ of the PTZ camera 113 at gentle speed and adjusts the angle of view of the PTZ camera 113 to the set imaging angle of view (wide angle of view).

Thereafter, the processing returns to step S102, and the processing in step S102 and subsequent step is executed.

As described above, as a result of the PTZ method and the cutting out method being effectively combined with only one PTZ camera 113, a captured image with an appropriate angle of view and image quality can be obtained.

4. Modifications

Hereinafter, modifications of the above-described embodiments of the present technology will be described.

<Modification Regarding Configuration of Information Processing System>

For example, in the information processing system 101 of FIG. 2, two or more wide-angle cameras 111 can be provided. Further, it is also possible to provide two or more PTZ cameras 113. As a result, while the number of imaging apparatuses increases, captured images with more types of angles of view can be obtained at a time.

Furthermore, for example, in the information processing system 401 of FIG. 10, two or more PTZ cameras 113 can be provided. As a result, while the number of imaging apparatuses increases, images with more types of angles of view can be obtained at a time.

Furthermore, for example, two or more microphones 112 can be provided in the information processing system 101 and the information processing system 401.

Furthermore, for example, in the information processing system 101, some or all of the functions (in particular, the functions of the information processing unit 251 in FIG. 4) of the information processing apparatus 114 can be provided in the wide-angle camera 111, the PTZ camera 113, or the switcher 115.

For example, the wide-angle camera 111 may perform the recognition processing of the situation of the imaging space. For example, the PTZ camera 113 may set candidates for the angle of view and an imaging angle of view and control the angle of view. Furthermore, for example, the PTZ camera 113 may also perform recognition processing of the situation of the imaging space. Furthermore, for example, the switcher 115 may include all the functions of the information processing apparatus 114.

Furthermore, for example, in the information processing system 401, some or all of the functions (in particular, the functions of the information processing unit 451 in FIG. 11) of the information processing apparatus 114 can be provided in the PTZ camera 113 or the switcher 115.

For example, the PTZ camera 113 may perform recognition processing of the situation of the imaging space. Furthermore, for example, the PTZ camera 113 may also set candidates for the angle of view and an imaging angle of view and control the angle of view. Furthermore, for example, the switcher 115 may include all the functions of the information processing apparatus 114.

Furthermore, for example, the information processing apparatus 114 may be applied to a server in cloud computing, or the like, and the server may provide a service for controlling the angle of view of the PTZ camera 113.

<Modification Regarding Method For Setting Main Subject>

For example, it is also possible to recognize two or more subjects as main subjects.

Furthermore, for example, the recognition result of the subject may be displayed on a display included in the output unit 207 of the information processing apparatus 114, and the user may select the main subject using the input unit 206.

Figure 12:
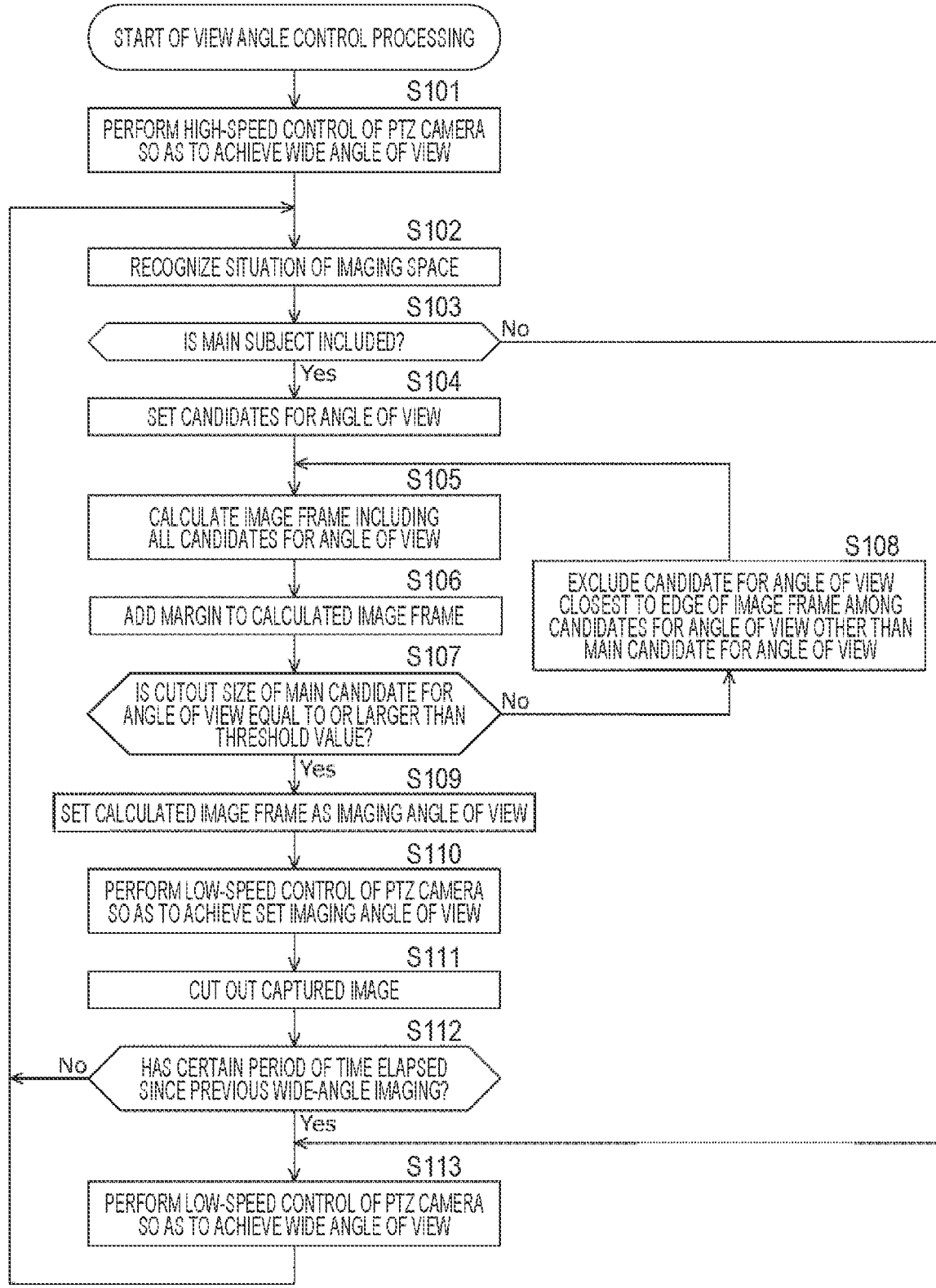
FIG. 12 is a flowchart for explaining a second embodiment of view angle control processing.

Furthermore, in the processing of step S103 of FIG. 12, a subject not included in the full angle-of-view image may be recognized on the basis of information other than sound (for example, sensor data other than the full angle-of-view image, and the like).

<Modification Regarding Setting Candidates for Angle of View>

For example, in a case where a captured image captured by the wide-angle camera 111 or an image cut out from the captured image is in a good condition, candidates for the angle of view similar to the angle of view of the image may be excluded.

Furthermore, for example, in a case where a position of the subject is substantially fixed in imaging at a studio, or the like, the user may set candidates for the angle of view in advance.

Furthermore, for example, a wide-angle image may be displayed on a display included in the output unit 207 of the information processing apparatus 114, the user may input candidates for the angle of view using the input unit 206, and the view angle candidate setting unit 281 may set the candidates for the angle of view on the basis of the user input.

<Modification Regarding Setting of Imaging angle of View>

For example, the set candidates for the angle of view may be displayed on a display included in the output unit 207 of the information processing apparatus 114, and the user may select a necessary candidate for the angle of view using the input unit 206. Then, the imaging view angle setting unit 282 or the imaging view angle setting unit 481 may set the imaging angle of view including the candidate for the angle of view selected by the user. In addition, the user may select the main candidate for the angle of view using a similar method.

Furthermore, for example, the imaging view angle setting unit 282, the imaging view angle setting unit 481, or the user may select a plurality of main candidates for the angle of view and set the imaging angle of view so that the cutout sizes of all the main candidates for the angle of view become equal to or larger than the threshold value.

<Modification Regarding Cutting Out of Captured Image>

For example, the cutting out unit 263 may estimate a candidate for the angle of view that is most likely to be used from the candidates for the angle of view included in the imaging angle of view and cut out an image with an angle of view corresponding to the estimated candidate for the angle of view.

Furthermore, for example, the cutting out unit 263 may estimate an angle of view that is highly likely to be used in the full angle-of-view image regardless of the candidates for the angle of view and cut out an image with the estimated angle of view.

Furthermore, for example, the full angle-of-view captured image and the angles of view corresponding to the respective candidates for the angle of view may be displayed on a display included in the output unit 207 of the information processing apparatus 114 so that the user may select a necessary angle of view using the input unit 206, and an image of the selected angle of view may be cut out.

<Modification Regarding PTZ Control of PTZ Camera 113>

In order to control the PTZ of the PTZ camera 113 with high accuracy, it is desirable to calculate PTZ values (a pan angle, a tilt angle, and a zoom magnification) of the PTZ camera 113 using three-dimensional information including the position of the subject in a depth direction.

For example, in the first embodiment, the three-dimensional information can be obtained using a triangulation method by providing two or more wide-angle cameras 111.

Furthermore, in a case where there is one wide-angle camera 111, for example, three-dimensional information can be obtained by using a camera including a depth sensor and a camera including a phase difference image for the wide-angle camera 111. Note that a method of the depth sensor is not particularly limited, and a method such as a time of flight (ToF) method or a structured light method can be used.

Furthermore, in a case where there is one wide-angle camera 111, for example, a method of estimating a position of each subject in the depth direction on the basis of the wide-angle image using a method such as deep learning can be adopted.

Furthermore, for example, in the first embodiment, in a case where the wide-angle camera 111 and the PTZ camera 113 are installed at substantially the same position, the PTZ values of the PTZ camera 113 can be directly estimated on the basis of a two-dimensional wide-angle image captured by the wide-angle camera 111.

Furthermore, for example, a sensor (for example, an ultra wide band (UWB) sensor, an infrared sensor, or the like) may be attached to a person, or the like, who can be a subject, and the position of each subject in the depth direction may be recognized on the basis of data from the sensor.

Note that, even if the position of each subject in the depth direction is not recognized, for example, control of the PTZ of the PTZ camera 113 can be speeded up by using a geometric constraint using an epipolar line.

<Other Modifications>

In the second embodiment, a timing of setting the wide angle of view is not necessarily every constant time and may be, for example, when a predetermined condition is satisfied, or other time.

Furthermore, the present technology can also be applied to, for example, a case of imaging an imaging space in which a special event is not performed. For example, the present technology can also be applied to a case of imaging an outdoor landscape or a case of imaging a predetermined monitoring area.

5. Others

<Configuration Example of Computer>

The above-described series of processing can be executed by hardware or software. In a case where the series of processing is executed by software, a program constituting the software is installed in a computer. Here, the computer includes a computer incorporated in dedicated hardware, a general-purpose personal computer capable of executing various functions by installing various programs, and the like, for example.

Note that the program executed by the computer may be a program in which processing is performed in time series in the order described in the present specification, or may be a program in which processing is performed in parallel or at necessary timing such as when a call is made.

In addition, in the present specification, a system means a set of a plurality of components (devices, modules (parts), etc.), and it does not matter whether or not all the components are in the same housing. Therefore, a plurality of devices housed in separate housings and connected via a network and one device in which a plurality of modules is housed in one housing are both systems.

Furthermore, the embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowchart can be executed by one device or can be shared and executed by a plurality of devices.

Furthermore, in a case where a plurality of processing is included in one step, the plurality of processing included in the one step can be executed by one device or can be shared and executed by a plurality of devices.

<Combination Example of Configuration>

The present technology can also have the following configurations.

(1)

An information processing apparatus including:
- a view angle candidate setting unit configured to set a plurality of candidates for an angle of view from a captured image range that can be captured by a first imaging apparatus with respect to a predetermined imaging space; and
- an imaging view angle setting unit configured to set an imaging angle of view of the first imaging apparatus on the basis of the plurality of candidates for the angle of view.

(2)

The information processing apparatus according to (1), further including
- a recognition unit configured to recognize a situation of the imaging space on the basis of a captured image obtained by imaging the imaging space,
- in which the view angle candidate setting unit sets the candidates for the angle of view on the basis of the situation of the imaging space.

(3)

The information processing apparatus according to (2),
- in which the recognition unit recognizes a main subject which is a main subject in the imaging space and a related subject related to the main subject, as the situation of the imaging space, and
- the view angle candidate setting unit sets the candidates for the angle of view on the basis of the recognized main subject and related subject.

(4)

The information processing apparatus according to (3),
- in which the recognition unit recognizes content of a scene in the imaging space as the situation of the imaging space, and
- the view angle candidate setting unit sets the candidates for the angle of view further on the basis of the content of the scene.

(5)

The information processing apparatus according to any one of (2) to (4),
- in which the recognition unit recognizes the situation of the imaging space on the basis of the captured image captured by the first imaging apparatus, and
- the imaging view angle setting unit sets the imaging angle of view to a wide angle of view having a largest field of view at a predetermined timing.

(6)

The information processing apparatus according to (5),
- in which the imaging view angle setting unit sets the imaging angle of view to the wide angle of view in a case where a main subject that is a main subject in the imaging space does not exist in the captured image captured by the first imaging apparatus.

(7)

The information processing apparatus according to any one of (2) to (4),
- in which the recognition unit recognizes the situation of the imaging space on the basis of a captured image captured by a second imaging apparatus.

(8)

The information processing apparatus according to any one of (1) to (7),
in which the imaging view angle setting unit sets the imaging angle of view so as to include the plurality of candidates for the angle of view.

(9)

The information processing apparatus according to (8),
in which the imaging view angle setting unit selects the candidates for the angle of view to be included in the imaging angle of view so that resolution of a main candidate for the angle of view is equal to or greater than a predetermined threshold value, the main candidate for the angle of view being estimated to be important among the plurality of candidates for the angle of view.

(10)

The information processing apparatus according to (9), further including
a recognition unit configured to recognize the situation of the imaging space on the basis of a captured image obtained by imaging the imaging space,
in which the view angle candidate setting unit selects the main candidate for the angle of view from the plurality of candidates for the angle of view on the basis of at least one of the situation of the imaging space or a usage of the captured image captured by the first imaging apparatus.

(11)

The information processing apparatus according to any one of (8) to (10),
in which the imaging view angle setting unit sets, as the imaging angle of view, a region in which a rectangular region including the plurality of candidates for the angle of view is provided with a margin in at least one direction.

(12)

The information processing apparatus according to any one of (8) to (11), further including
a cutting out unit configured to cut out an image of an angle of view corresponding to at least one of the candidates for the angle of view from the captured image captured by the first imaging apparatus.

(13)

The information processing apparatus according to (12),
in which the cutting out unit cuts out images of a plurality of angles of view respectively corresponding to the candidates for the angle of view from the captured image captured by the first imaging apparatus.

(14)

The information processing apparatus according to any one of (1) to (13), further including
a view angle control unit configured to control panning, tilting, and zooming of the first imaging apparatus so as to achieve the set imaging angle of view.

(15)

The information processing apparatus according to (14),
in which the view angle control unit controls a driving speed of panning, tilting, and zooming of the first imaging apparatus on the basis of whether or not a predetermined role is assigned to the captured image captured by the first imaging apparatus.

(16)

The information processing apparatus according to one of (1) to (15),
in which the information processing apparatus is provided in the first imaging apparatus.

(17)

An information processing method including:
by an information processing apparatus,
setting a plurality of candidates for an angle of view from a captured image range that can be captured by an imaging apparatus with respect to a predetermined imaging space; and
setting an imaging angle of view of the imaging apparatus on the basis of the plurality of candidates for the angle of view.

(18)

A program for causing a computer to execute processing of:
setting a plurality of candidates for an angle of view from a captured image range that can be captured by an imaging apparatus with respect to a predetermined imaging space; and
setting an imaging angle of view angle of the imaging apparatus on the basis of the plurality of candidates for the angle of view.

Note that the effects described in the present specification are merely examples and are not limited, and other effects may be provided.

REFERENCE SIGNS LIST

101 Information processing system
111 Wide-angle camera
112 Microphone
113 PTZ camera
114 Information processing apparatus
115 Switcher
201 CPU
251 Information processing unit
261 Calibration unit
262 Imaging control unit
263 Cutting out unit
271 Recognition unit
272 View angle setting unit
273 View angle control unit
281 View angle candidate setting unit
282 Imaging view angle setting unit
401 Information processing system
451 Information processing unit
461 Imaging control unit
471 Recognition unit
472 View angle control unit
481 Imaging view angle setting unit

The invention claimed is:

1. An information processing apparatus comprising:
a view angle candidate setting unit configured to set a plurality of candidates for an angle of view from a captured image range that can be captured by a first imaging apparatus with respect to a predetermined imaging space; and
an imaging view angle setting unit configured to set an imaging angle of view of the first imaging apparatus based on the plurality of candidates for the angle of view,
wherein the view angle candidate setting unit sets the plurality of candidates for the angle of view based on a situation of the imaging space recognized based on a captured image captured by a second imaging apparatus, and
wherein the view angle candidate setting unit and the imaging view angle setting unit are each implemented via at least one processor.

2. The information processing apparatus according to claim 1, further comprising:
a recognition unit configured to recognize the situation of the imaging space based on the captured image obtained by imaging the imaging space,
wherein the recognition unit is implemented via at least one processor.

3. The information processing apparatus according to claim 2,
wherein the recognition unit recognizes a main subject which is a main subject in the imaging space and a related subject related to the main subject, as the situation of the imaging space, and
wherein the view angle candidate setting unit sets the candidates for the angle of view based on the recognized main subject and related subject.

4. The information processing apparatus according to claim 3,
wherein the recognition unit recognizes content of a scene in the imaging space as the situation of the imaging space, and
wherein the view angle candidate setting unit sets the candidates for the angle of view further based on the content of the scene.

5. The information processing apparatus according to claim 2,
wherein the recognition unit recognizes the situation of the imaging space based on the captured image captured by the first imaging apparatus, and
wherein the imaging view angle setting unit sets the imaging angle of view to a wide angle of view having a largest field of view at a predetermined timing.

6. The information processing apparatus according to claim 5,
wherein the imaging view angle setting unit sets the imaging angle of view to the wide angle of view in a case where a main subject that is a main subject in the imaging space does not exist in the captured image captured by the first imaging apparatus.

7. The information processing apparatus according to claim 1,
wherein the imaging view angle setting unit sets the imaging angle of view so as to include the plurality of candidates for the angle of view.

8. The information processing apparatus according to claim 7,
wherein the imaging view angle setting unit selects the candidates for the angle of view to be included in the imaging angle of view so that resolution of a main candidate for the angle of view is equal to or greater than a predetermined threshold value, the main candidate for the angle of view being estimated to be important among the plurality of candidates for the angle of view.

9. The information processing apparatus according to claim 8, further comprising:
a recognition unit configured to recognize the situation of the imaging space based on a captured image obtained by imaging the imaging space, wherein the view angle candidate setting unit selects the main candidate for the angle of view from the plurality of candidates for the angle of view based on at least one of the situation of the imaging space or a usage of the captured image captured by the first imaging apparatus, and
wherein the recognition unit is implemented via at least one processor.

10. The information processing apparatus according to claim 7,
wherein the imaging view angle setting unit sets, as the imaging angle of view, a region in which a rectangular region including the plurality of candidates for the angle of view is provided with a margin in at least one direction.

11. The information processing apparatus according to claim 7, further comprising:
a cutting out unit configured to cut out an image of an angle of view corresponding to at least one of the candidates for the angle of view from the captured image captured by the first imaging apparatus,
wherein the cutting out unit is implemented via at least one processor.

12. The information processing apparatus according to claim 11,
wherein the cutting out unit cuts out images of a plurality of angles of view respectively corresponding to the candidates for the angle of view from the captured image captured by the first imaging apparatus.

13. The information processing apparatus according to claim 1, further comprising:
a view angle control unit configured to control panning, tilting, and zooming of the first imaging apparatus so as to achieve the set imaging angle of view,
wherein the view angle control unit is implemented via at least one processor.

14. The information processing apparatus according to claim 13,
wherein the view angle control unit controls a driving speed of panning, tilting, and zooming of the first imaging apparatus based on whether or not a predetermined role is assigned to the captured image captured by the first imaging apparatus.

15. The information processing apparatus according to claim 1,
wherein the information processing apparatus is provided in the first imaging apparatus.

16. An information processing method, executed by at least one processor of an information processing apparatus, the method comprising:
setting a plurality of candidates for an angle of view from a captured image range that can be captured by an imaging apparatus with respect to a predetermined imaging space; and
setting an imaging angle of view of the imaging apparatus based on the plurality of candidates for the angle of view,
wherein the plurality of candidates for the angle of view are set based on a situation of the imaging space recognized based on a captured image captured by a second imaging apparatus.

17. A non-transitory computer-readable storage medium having embodied thereon a program, which when executed by a computer causes the computer to execute an information processing method, the method comprising:
setting a plurality of candidates for an angle of view from a captured image range that can be captured by an imaging apparatus with respect to a predetermined imaging space; and
setting an imaging angle of view angle of the imaging apparatus based on the plurality of candidates for the angle of view, wherein the plurality of candidates for the angle of view are set based on a situation of the imaging space recognized based on a captured image captured by a second imaging apparatus.

* * * * *